A. V. ROE.
BODY STRUCTURE FOR ROAD VEHICLES AND THE LIKE.
APPLICATION FILED APR. 2, 1920.

1,347,592.

Patented July 27, 1920.
3 SHEETS—SHEET 3.

A. V. ROE.
Inventor

UNITED STATES PATENT OFFICE.

ALLIOTT V. ROE, OF BURSLEDON, ENGLAND.

BODY STRUCTURE FOR ROAD-VEHICLES AND THE LIKE.

1,347,592.   Specification of Letters Patent.   Patented July 27, 1920.

Application filed April 2, 1920. Serial No. 370,827.

*To all whom it may concern:*

Be it known that I, ALLIOTT VERDON ROE, a subject of the King of Great Britain, residing at Bursledon, Hampshire, England, have invented certain new and useful Improvements in and Connected with Body Structures for Road-Vehicles and the like, of which the following is a specification.

This invention relates to improvements in and connected with body structures for road vehicles and the like and has particular reference to bodies and hoods for automobiles though applicable to other types of vehicles.

In an ordinary touring car, when the hood is folded back the occupants (and particularly those in the rear seats) experience an unpleasant draft around their heads moreover the ordinary hood is unsightly when folded and collects dust.

It is the primary object of my present invention to obviate these disadvantages by providing at the rear of the vehicle body, a novel and improved superstructure in the form of a shallow, fixed or collapsible canopy, adapted to arrest the rush of air about the occupants' heads without impairing the several advantages which accrue from the use of an open body in fair weather. The shallow canopy aforesaid has a rigid or rigidly framed roof and I achieve a further object of my invention by providing a rigid auxiliary roof section, attachable at will, either to the said canopy roof or to an extraneous supporting frame spaced apart therefrom, and a collapsible roof structure or awning adapted to be extended between said canopy roof and said rigid auxiliary roof section.

The canopy aforesaid is a rigid or rigidly framed structure and is preferably made shallow, so that it does not materially obstruct the outlook of passengers in the seat or seats beneath it. It may be provided with a suitable and conveniently situated transparent window or windows and, if desired, may be either collapsible upon the body proper or constructed in detachable sections.

The collapsible awning, when not in use, is stowed away in or upon the canopy top and the rigid auxiliary roof section, which forms one of the terminal supports for said awning when extended, is detachably secured to the canopy roof preferably as an extension or "peak" thereto.

When it is desired to extend the awning this auxiliary roof section is transferred from the canopy to a forwardly located support which may be comprised in the front wind-screen framework or in a separate frame or fixture attached to the dashboard or other suitable member near the front of the vehicle.

The housing in which the awning is stowed when not in use, may comprise a box-like structure in or upon the roof of the canopy or may consist simply of a shelf, rack, or hammock supported immediately beneath the said roof.

In some cases I may make the awning of substantially rigid members, hinged together and foldable into a compact form for stowage in which case no special housing may be required.

When the awning is stowed away the top of the canopy is faired off, as regards its front edge by the rigid auxiliary roof section which, for this purpose, is formed in a tapering or approximately streamline shape and covers the front of the housing for the awning afore mentioned. Such fairing is desirable both for the sake of appearance and in order to diminish any tendency toward the formation of objectionable eddy currents in the top of the canopy. The rigid auxiliary roof section is preferably attached to the forward edge of the awning so that the action of stowing away the said awning automatically brings the auxiliary roof section adjacent the canopy roof, with which it has suitable means of engagement, hereinafter described—while, conversely, the removal of said auxiliary roof section from the canopy roof and its transference to the extraneous supporting means necessarily effects withdrawal of said awning from its housing.

By reason of the peak-like tapering contour of the auxiliary roof section, the vehicle body presents a neat and finished appearance whether the awning is stowed away or extended; in the latter case the "peak" provides a neatly faired "entry" for the said awning while affording a substantial terminal support therefor.

In order to maintain the contour of a flexible awning when extended I may provide a suitable contour-defining framework, adapted to collapse into the canopy top when desired but in general practice I find it satisfactory to employ a plurality of collapsible or compressible contour-defining struts, which, when the said awning is extended, are introduced in a state of compression between the canopy and the rigid auxiliary roof section so that the faces of said struts lie adjacent the flexible material of the awning while their ends, abutting against suitable projections in the canopy and the auxiliary roof section respectively, tend to force those two members apart and so put the awning in a state of tension.

The canopy, of my invention, has a rigid or rigidly framed roof member and may have collapsible or detachable side and back members, whereby, if desired, the said roof member can be superimposed directly upon the top of the body proper. Thus, in the case of a vehicle body comprising front and rear seats (e. g. a 4-seater motor car body) when the rear seats are not in use, the rear portion of the body may be covered by superimposing the canopy top directly upon it, which arrangement effectively protects the interior from the elements and may, at the same time, provide a convenient receptacle for the luggage of persons occupying the front seats.

The accompanying drawings illustrate a preferred embodiment of my invention but I desire it to be understood that I do not restrict my said invention to the exact construction hereinafter particularly described but may embody it in any construction falling within the scope of my claims hereunto appended.

In these drawings.

Referring to these drawings, wherein like numerals of reference indicate corresponding parts, wherever occurring throughout all the figures, the numeral 1 designates the chassis of a motor vehicle having a body 2 provided with a scuttle dash 3 and windscreen frame work 4 and containing a pair of front seats $5^a$ and a pair of rear seats $5^b$. Upon the rear portion of this body member I have illustrated in Figs. 1, 2 and 4 a superstructural canopy comprising a pair of side panels 6 united by a rear panel 7, the whole being surmounted by a curved hollow roof member 8.

A flexible awning 9 is attached at its rear edge to the canopy roof 8 and at its forward edge to an auxiliary rigid roof member or peak 10 which has means of attachment to the windscreen frame 4 for use when the awning is extended and further means of atachment to the said canopy roof for use when the said awning is stowed away. Compressible struts 11 maintain the flexible awning in tension when extended and any variation in the length of the said awning is compensated by adjustable connections between the peak member 10 and the frame 4, in a manner hereinafter to be described.

Figures 1, 2, 5, 6, 7, 8, 9:
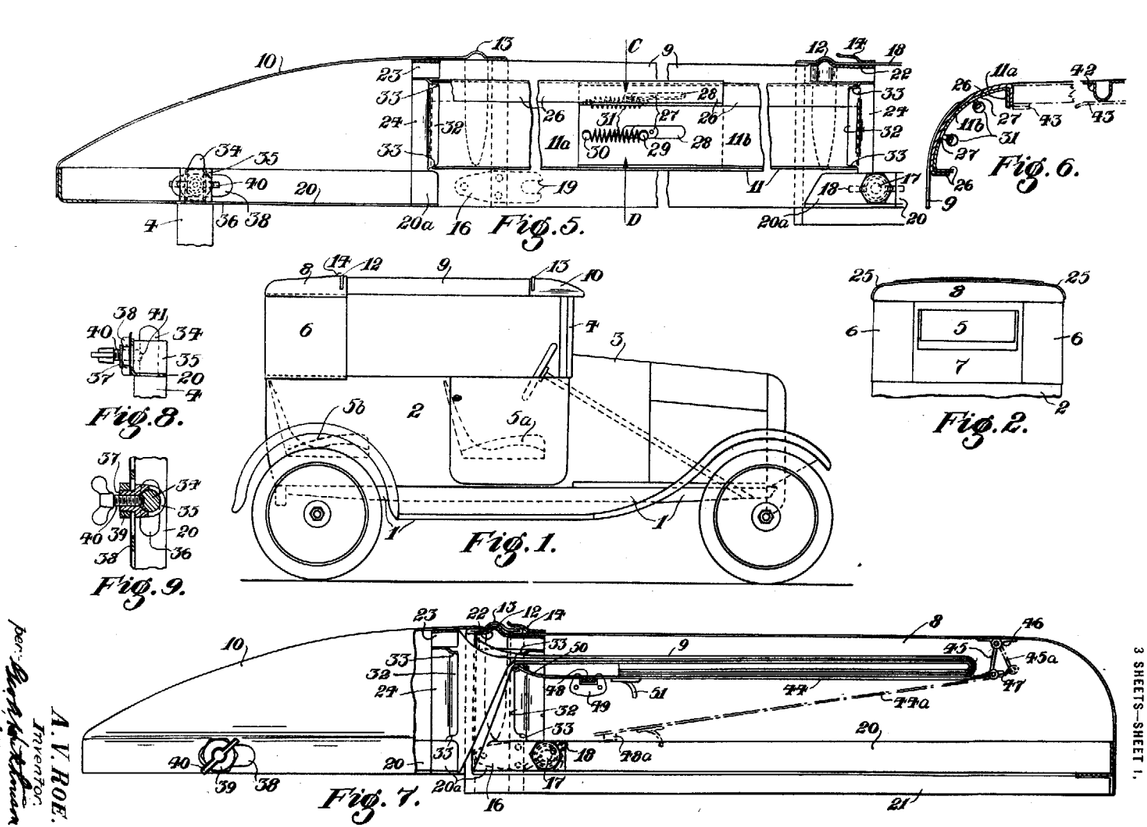
Figure 1 is a side elevational view of a motor vehicle having a body fitted with a superstructure in accordance with my invention. In this view the awning above referred to is shown in the extended position.
Fig. 2 is a rear elevational view of the superstructure shown in Fig. 1.
Fig. 5 is a sectional view to a larger scale of a portion of the canopy and its attachments as they appear with the awning extended; the section being taken on line A—B of Fig. 3.
Fig. 6 is a sectional end view through the awning and one of the compressible struts for supporting the same; the section being taken on line C—D of Fig. 5.
Fig. 7 is a part sectional view of the complete canopy top and its attachments as they appear when the awning is stowed away; the section being taken in the same plane as in Fig. 5.
Fig. 8 is a fragmentary view showing in rear elevation a constructional detail hereinafter particularly described.
Fig. 9 is a fragmentary and part sectional view illustrating in plan the fitting shown in Fig. 8 and a portion of the members with which it is associated.
Figure 10:
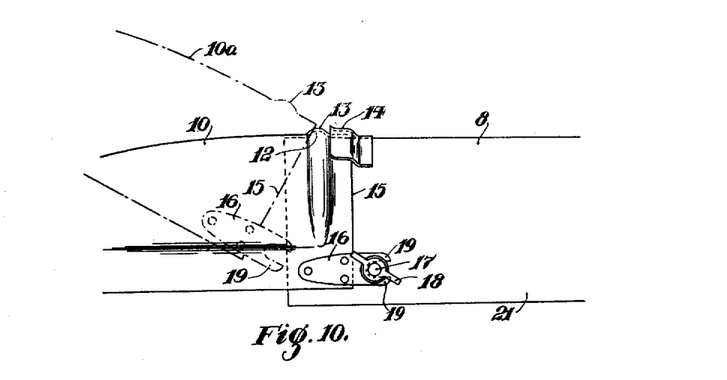
Fig. 10 is an exterior side elevational view of a portion of the superstructural members shown sectionally in Fig. 7

Referring now particularly to Figs. 5 to 10 of the drawings (inclusive), it will be observed that when the awning is stowed away, the peak member 10 slightly overlaps the front edge of the canopy roof 8 and each of these members is provided, near its edge with a raised transverse swaging so located and conformed that the convex side of swage 12 on the canopy is adapted to fit within the concave side of the swage 13 upon the peak. This condition is readily apparent in Figs. 7 and 10. A lipped member 14 fixed to the canopy top and extending transversely thereover, in close proximity to the swage 12 is adapted to be engaged by the rear edge portion 15 of the peak 10 and provides a stop for said peak, while at the same time it helps to hold the two swages 12 and 13 in mutual engagement as shown in Fig. 7. It will readily be apparent that the swages may be engaged or disengaged by tilting the peak upward as indicated by the chain dotted lines $10^a$ in Fig. 10. A forked fitting 16 projects from the rear edge 15 of the peak, on either side thereof and the forked end of this fitting is adapted to engage a stud or bolt 17 protruding from the side of the canopy roof 8. A winged nut 18 working upon the stud 17 serves to grip the prongs 19 of said forked fitting and thus to lock the peak securely to the canopy roof as shown at Figs. 7 and 10.

Figs. 5 and 7 illustrate the internal construction of the canopy roof 8 and peak 10 and the manner of attaching the flexible awning thereto. It will be observed that the lower edges of both the canopy roof and the peak are stiffened by angle members 20 but the edge of the canopy roof has a lip 21 dependent below the horizontal flange of the angle and preferably extending continuously around the sides and back. The object of this lip is to locate the said canopy roof positively upon the structure on which it rests—whether that structure consist of the side and back members 6 and 7 (Fig. 2) or of the body proper, as when the canopy occupies the position shown in Fig. 11.

The top of the awning 9 is clamped at its forward end between the inner side of the peak 10 and a clamping plate 23 and at its rear end between inner side of the roof 8 and a clamping plate 22 the latter being extra wide and fitted to the inner contour of the swage 12 in order to insure a perfectly watertight joint adapted—for instance—to withstand the effects of fiercely driving rain. The sides of the awning 9 are clamped at their ends to the roof members 8 and 10, partly by detachable sections 20ᵃ of the angle members 20 and partly by curved clamping plates 24 whose shape conforms to the contour of the said members in the regions 25 (Fig. 2). The compressible struts 11 which maintain the awning in tension are also curved in cross section, so that they function as contour definers or "formers" for the sides of the flexible awning (as indicated at Fig. 6) and they are stiffened longitudinally by means of inturned radial flanges 26. In effect, therefore, each of these struts has a substantially C-shaped cross-section and on reference to Figs. 5 and 6 it will be observed that each comprises a pair of similar members adapted to slide relatively, one within the other. The ends of the two similar telescopic members 11ᵃ and 11ᵇ overlap substantially in the middle of the strut and guide blocks 27 fixed upon the inner face of the outer member 11ᵃ are adapted to ride in longitudinal slots 28 in the inner member 11ᵇ. Posts 29 upon the guide blocks 27 are connected to posts 30 on the inner members 11ᵇ by tension springs 31 which latter thus tend to eject the inner member 11ᵇ from the outer member 11ᵃ (i. e. to increase the overall length of the complete strut 11.) The range of relative movement between the two members is, of course, determined by the limits of the slots 28. In operation the extremities of each of the compressible struts 11 are engaged beneath opposing lips 32 upon the curved clamping plate 24 in the canopy roof 8 and peak 10 respectively and it will be apparent from Fig. 5 that the radial flanges 26 of the struts abut against the top and bottom edges 33 of the lips 32 and thereby operate to prevent lateral displacement of the said struts.

The windscreen frame 4 to which the auxiliary roof member or peak 10 is attached when the awning 9 is extended has on either side an upstanding post or projection 34 (Figs. 5, 8 and 9) adapted to engage in the bore of a clamping socket 35 slidably mounted within the angle member 20 so as to permit the position of the said peak in relation to the frame 4 to be adjusted after engagement. This adjustment has for its object, to permit the awning to be made quite taut, under the influence of the tensioning struts 11 and to this end the post 34 passes through an elongated slot 36 in the horizontal flange of the angle member 20 before engaging the clamping socket 35, which latter has a threaded boss 37 emerging through a slot 38 in the vertical flange of the said angle member. A locknut 39 threaded onto the projecting portion of the boss 37 provides means for fixing the socket bodily in relation to the peak member and a set screw 40, passing axially through the said boss, has a pointed extremity 41 adapted to engage a corresponding recess on the post 34. Thus it will be seen that the two clamping means embodied in the socket fitting 35 are entirely distinct and may each be operated independently of the other.

Figure 3:
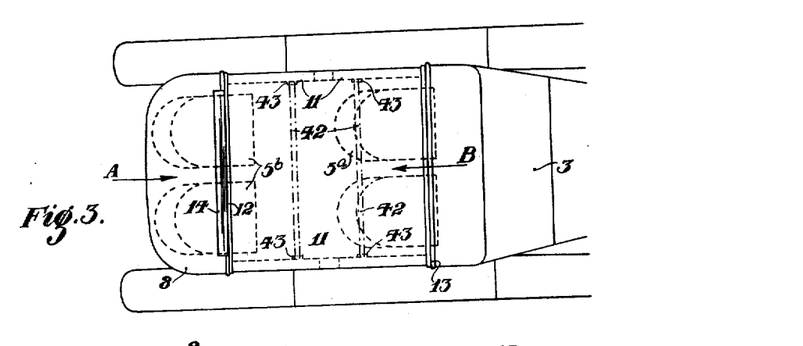
Fig. 3 is a plan view of the vehicle illustrated in Fig. 1.

As an adjunct to the compressible contour defining struts 11 and for the purpose of affording further support to the top of the flexible awning 9 I may in some cases employ one or more transverse formers 42 (indicated in chain dotted lines at Figs. 3 and 6). Such formers may conveniently be of U-section with outturned flanges (see Fig. 6) which bear against and preferably are attached to the material of the awning. They are of such length that their extremities abut against the vertical flanges 26 of the struts 11 and they are supported—and caused to press against the flexible material—by means of short ledges or flanges 43 which may be integral with and inturned from the said flanges 26 or may consist of small angle brackets fixedly attached thereto. It will be understood that if the transverse formers 42 are attached to the material of the awning they recede with it into the canopy when it is stowed away but since their use is not generally essential to the successful operation of the device I have not considered it necessary or desirable to include them in Fig. 7 of the drawings to which figure I will now particularly refer.

In Fig. 7 the peak 10 is shown as attached to the canopy roof 8 and the awning 9 is folded and rests upon a shelf 44 which is somewhat narrower than the width of the said canopy roof.

A dependent member 45 anchors the rear end of this shelf to the roof of the canopy said dependent member being either rigid and pivoted at 46 and 47, as shown in the drawings, or flexible and attached without pivoting. Support for the front of the shelf is provided by a transverse bar 48 whose extremities project slightly beyond the sides of said shelf and engage shallow channel brackets 49 fixed upon and protruding from the sides of the canopy top. The front edge of the shelf 44 is preferably upswept as at 50 so as to provide a slightly hollow receptacle for the folds of the awning 9. In order to enable the awning conveniently to be inserted or removed from the shelf 44 it is desirable to release the latter from its forward support and permit it to drop toward the vertical: to effect this movement it is first raised sufficiently to disengage the extremities of the transverse bar 48 from the channel brackets 49 and then pushed rearwardly by means of a finger grip 51 so that the bar 48 is moved out of the plane of the brackets 49 (as at 48$^a$) and the rear suspension member 45 swung back to a position such as 45$^a$ (Fig. 7) when the front edge of the shelf is free to drop in the manner indicated by the chain dotted lines 44$^a$.

The shelf 44, as illustrated in Fig. 7 may conveniently be made in light sheet metal and is simple and effective in operation but it will be understood that I may employ any suitable alternative means for supporting the folded awning. According to one such modification I may carry the awning in a flexible hammock detachably hung within the canopy roof 8 and (or) the peak 10 or I may provide the awning itself with suitable straps or other fastenings by which it may, when folded, be suspended close to the roof of the superstructure.

Figure 4:
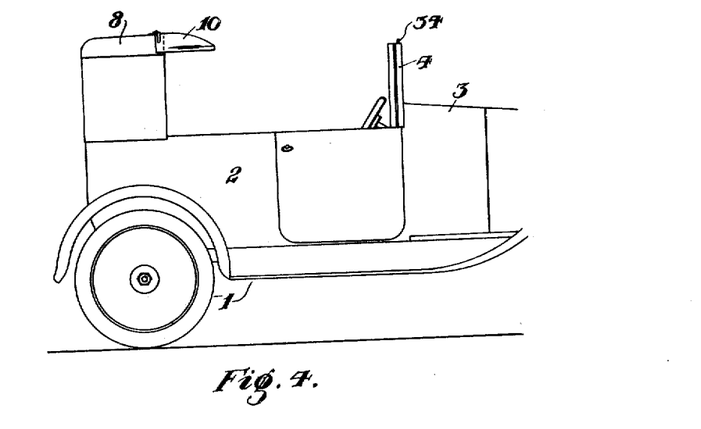
Fig. 4 is a view similar to Fig. 1 but illustrating the appearance of the superstructure when the awning is stowed away within the canopy.

Fig. 4 of the drawings shows the appearance of my improved superstructure as normally used in fair weather: it will be observed that the canopy structure shelters the occupants of the rear seats 5$^b$ from dust and drafts yet permits an ample circulation of air and does not materially obstruct their outlook. In Fig. 2 I have shown a sash window 5 in the rear panel 7 and I may provide further windows in the side panels 6 if desirable.

In case of rain the awning is extended, as at Fig. 1 to provide a shelter over all the seats and, in the side panels of the body 2 I may locate sash windows adapted to be raised to meet the awning, whereby a totally inclosed body—in effect a limousine—is obtained.

Figure 11:
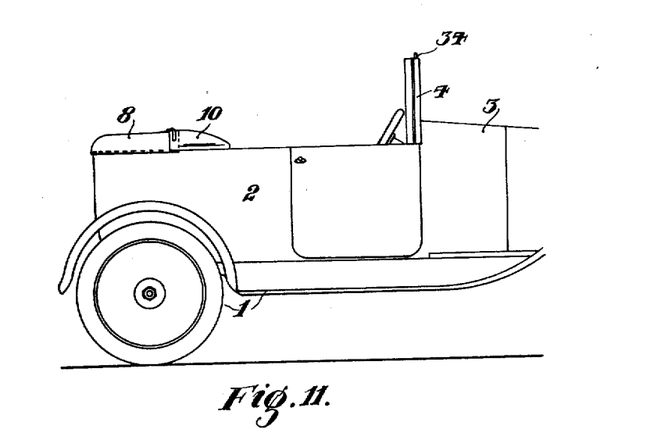
Fig. 11 is a side elevational view of the vehicle body of Fig. 1 but illustrates the manner of superimposing the canopy top and auxiliary roof member directly upon the rear portion of the body proper.

Fig. 11 shows the 4-seater body of Figs. 2 and 4 converted into an open 2-seater, the panels 6 and 7 being removed and the canopy roof 9 with peak 10, superimposed directly upon the top of the body proper so as to cover the space normally occupied by the rear seats 5$^b$. These latter may be left *in situ* or may be removed to provide capacious accommodation for luggage or the like. It will be understood that the several sections of the canopy structure are bolted or otherwise secured together in such a manner that they may easily and expeditiously be taken apart and reassembled for the purposes above mentioned.

I claim:—

1. A superstructure for road vehicles comprising in combination a canopy superimposed upon the body proper, a rigid auxiliary roof section, a support therefor disposed toward the front of the body proper, a foldable awning permanently connecting said canopy and said auxiliary roof section, and means for supporting the auxiliary roof section as a forward extension to said canopy roof and means supporting the folded awning on said canopy roof when said auxiliary roof section is disposed as a forward extension to said canopy roof.

2. A superstructure for road vehicles comprising in combination a canopy superimposed upon the body proper, a rigid auxiliary roof section, a support therefor disposed toward the front of the body proper, a foldable awning permanently connecting said canopy and said auxiliary roof section, means for resiliently maintaining the unfolded awning fully extended, comprising telescopic, resilient tensional strut members detachably secured to the canopy roof and to said auxiliary roof section, and means for supporting the auxiliary roof section as a forward extension to said canopy roof and means for supporting the folded awning on said canopy roof when said auxiliary roof section is disposed as a forward extension to said canopy roof.

3. A superstructure for road vehicles, comprising in combination a canopy superimposed upon the body proper, a rigid auxiliary roof section, a support therefor disposed toward the front of the body proper, a foldable awning permanently connecting said canopy and said auxiliary roof section, longitudinally and removably arranged resilient supporting and tightening means for said awning disposed as extensible distance pieces between said canopy roof and said auxiliary roof section, means for supporting the auxiliary roof section as a forward extension to said canopy roof, and means for supporting the folded awning on said canopy roof when said auxiliary section is disposed as a forward extension to said canopy roof.

4. A superstructure for road vehicles, comprising in combination a canopy superimposed upon the body proper, a rigid auxiliary roof section, a support therefor disposed toward the front of the body proper, a foldable awning connecting said canopy and said auxiliary roof section, means for maintaining the awning fully extended and for defining the contour thereof, comprising telescopic former strut members, tensional springs connecting their overlapping ends, and projecting plate members fixed to said canopy roof and to said auxiliary roof structure disposed to support the respective free ends of said strut members, means for supporting the auxiliary roof section as a forward extension to said canopy roof, and means for supporting the folded awning on said canopy roof.

5. A superstructure for road vehicles, comprising in combination a canopy superimposed upon the body proper, a rigid auxiliary roof section, a support therefor disposed toward the front of the body proper, a foldable awning secured to said canopy and said auxiliary roof section by clamping plates, means for maintaining the awning fully extended comprising telescopic tensional strut members detachably secured to the canopy roof and to said auxiliary roof section, means for supporting the folded awning within said canopy roof comprising a hinged shelf member supported at its forward end, means for displacing the hinge axis, means for supporting the auxiliary roof section as a forward extension to said canopy roof, and means for supporting the folded awning on said canopy roof.

6. A superstructure for road vehicles, comprising in combination a canopy superimposed upon the body proper, a rigid auxiliary roof section, a support therefor disposed toward the front of the body proper, a foldable awning secured to said canopy and said auxiliary roof section by clamping plates, means for maintaining the awning fully extended and for defining the contour thereof, comprising telescopic former strut members, tensional springs connecting their overlapping ends, and projecting plate members fixed to said canopy roof and to said auxiliary roof structure disposed to support the respective free ends of said strut members, means for supporting the folded awning within said auxiliary roof section comprising a hinged shelf member supported at its forward end, means for displacing the hinge axis, means for supporting the auxiliary roof section as a forward extension to said canopy roof, and means for supporting the folded awning on said canopy roof.

7. A superstructure for road vehicles, comprising in combination a canopy superimposed upon the body proper, a rigid auxiliary roof section, a support therefor disposed toward the front of the body proper, a foldable awning secured to said canopy and said auxiliary roof section by clamping plates, means for maintaining the awning fully extended comprising telescopic tensional strut members detachably secured to the canopy roof and to said auxiliary roof section, means for supporting the folded awning within said canopy roof comprising a hinged shelf member supported at its forward end, means for displacing the hinge axis, means for supporting the auxiliary roof section as a forward extension to said canopy roof, comprising a flute or corrugation on the crown of the rear end of the auxiliary roof section, a flute or corrugation on the crown of the forward end of the canopy roof, means for effecting superimposition of said flutes or corrugations, and means for maintaining the superimposed position disposed at the lower part of said auxiliary roof section and canopy roof.

8. A superstructure for road vehicles, comprising in combination a canopy superimposed upon the body proper, a rigid auxiliary roof section, a support therefor disposed toward the front of the body proper, a foldable awning secured to said canopy and said auxiliary roof section by clamping plates, means for maintaining the awning fully extended and for defining the contour thereof, comprising telescopic former strut members, tensional springs connecting their overlapping ends, and projecting plate members fixed to said canopy roof and to said auxiliary roof structure disposed to support the respective free ends of said strut members, means for supporting the folded awning within said canopy roof comprising a hinged shelf member supported at its forward end, means for displacing the hinge axis, and means for supporting the auxiliary roof section as a forward extension to said canopy roof comprising a flute or corrugation on the crown of the rear end of the auxiliary roof section, a flute or corrugation on the crown of the forward end of the canopy roof, means for effecting superimposition of said flutes or corrugations, and means for maintaining the superimposed position disposed at the lower part of said auxiliary roof section and canopy roof.

9. A superstructure for road vehicles comprising in combination a canopy superimposed upon the body proper, a rigid auxiliary roof section, a forward supporting frame, means comprising projections on said frame and coöperating slots in said auxiliary roof section for adjustably securing said auxiliary roof thereon, a foldable awning permanently connecting said canopy and said auxiliary roof section, means for resiliently maintaining said awning fully extended comprising telescopic resilient tensional strut members detachably secured to the canopy roof and to said auxiliary roof sections, means for supporting the auxiliary roof section as a forward extension to said canopy roof, and means for supporting the folded awning on said canopy roof when said auxiliary roof section is disposed as a forward extension to said canopy roof.

10. A superstructure for road vehicles comprising in combination a canopy superimposed upon the body proper, a rigid auxiliary roof section, a wind screen, means for adjustably securing said auxiliary roof thereon, a foldable awning secured to said canopy and said auxiliary roof section by clamping plates, means for maintaining the awning fully extended comprising telescopic tensional strut members detachably secured to the canopy roof and to said auxiliary roof section, means for supporting the folded awning within said canopy roof comprising a hinged shelf member supported at its forward end, means for displacing the hinge axis, and means for supporting the auxiliary roof section as a forward extension of said canopy roof.

11. A superstructure for road vehicles comprising in combination a canopy superimposed upon the body proper, a rigid auxiliary roof section, a wind screen, means for adjustably securing said auxiliary roof thereon, a foldable awning secured to said canopy and said auxiliary roof section by clamping plates, means for maintaining the awning fully extended and for defining the contour thereof, comprising telescopic former strut members, tensional springs connecting their overlapped ends, and projecting plate members fixed to said canopy roof and to said auxiliary roof structure disposed to support the respective free ends of said strut members, means for supporting the folded awning within said canopy roof comprising a hinged shelf member supported at its forward end, means for displacing the hinge axis, and means for supporting the auxiliary roof section as a forward extension to said canopy roof.

12. A superstructure for road vehicles comprising in combination a canopy superimposed upon the body proper, a rigid auxiliary roof section, a wind screen, means for adjustably securing said auxiliary roof thereon, a foldable awning secured to said canopy and said auxiliary roof section by clamping plates, means for maintaining the awning fully extended and for defining the contour thereof, comprising telescopic former strut members, said strut members being of quadrant section and having inturned radial flanges, tensional springs connecting their overlapping ends, and projecting plate members fixed to said canopy roof and to said auxiliary roof structure disposed to support the respective free ends of the said strut members, transverse crown stretchers for the awning disposed between and against the adjacent inturned parallel radial flanges, means for supporting the auxiliary roof section as a forward extension to said canopy roof and means for supporting the folded awning on said canopy roof.

13. A superstructure for road vehicles, comprising in combination a canopy superimposed upon the body proper, a rigid auxiliary roof section, a forward supporting frame, means for adjustably securing the said auxiliary roof section thereon, comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said canopy and said auxiliary roof section by clamping plates, means for maintaining the awning fully extended comprising telescopic tensional strut members detachably secured to the canopy roof and to said auxiliary roof section, means for supporting the auxiliary roof section as a forward extension to said canopy roof and means for supporting the folded awning on said canopy roof.

14. A superstructure for road vehicles, comprising in combination a canopy superimposed upon the body proper, a rigid auxiliary roof section, a forward supporting frame, means for adjustably securing the said auxiliary roof section thereon, comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said awning and said auxiliary roof section by clamping plates, means for maintaining the canopy fully extended and for defining the contour thereof, comprising telescopic former strut members, tensional springs connecting their overlapping ends, and projecting plate members fixed to said canopy and to said auxiliary roof section disposed to support the respective free ends of said strut members, means for supporting the auxiliary roof section as a forward extension to said canopy roof and means for supporting the folded awning on said canopy roof.

15. A superstructure for road vehicles comprising in combination a canopy superimposed upon the body proper, a rigid auxiliary roof section, a forward supporting frame, means for adjustably securing the said auxiliary roof section thereon comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said awning and said auxiliary roof section by clamping plates, means for maintaining the canopy fully extended comprising telescopic tensional strut members detachably secured to the canopy roof, means for supporting the folded awning within said canopy roof, comprising a hinged shelf member supported at its forward end, means for displacing the hinge axis, and means for supporting the auxiliary roof section as a forward extension to said canopy roof.

16. A superstructure for road vehicles comprising in combination a canopy superimposed upon the body proper, a rigid auxiliary roof section, a forward supporting frame, means for adjustably securing the said auxiliary roof section thereon comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said canopy and said auxiliary roof section by clamping plates, means for maintaining the awning fully extended comprising telescopic tensional strut members detachably secured to the canopy roof, means for supporting the folded awning within said canopy roof comprising a hinged shelf member supported at its forward end, means for displacing the hinge axis, and means for supporting the auxiliary roof section as a forward extension to said canopy roof, comprising a flute or corrugation on the crown of the rear end of the auxiliary roof section, a flute or corrugation on the crown of the forward end of the canopy roof, means for effecting superimpositioning of said flutes or corrugations, and means for maintaining the superimposed position disposed at the lower parts of said auxiliary roof section and canopy roof.

17. A superstructure for road vehicles, comprising in combination a canopy superimposed upon the body proper, a rigid auxiliary roof section, a forward supporting frame, means for adjustably securing the said auxiliary roof section thereon comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said canopy and said auxiliary roof section by clamping plates, means for maintaining the awning fully extended and for defining the contour thereof, comprising telescopic former strut members, of quadrant section, and having inturned radial flanges, tensional springs connecting their overlapping ends, and projecting plate members fixed to said canopy and to said auxiliary roof section disposed to support the respective free ends of said strut members, transverse crown stretchers for the awning disposed between and against the adjacent inturned parallel radial flanges, means for supporting the folded awning and transverse crown stretchers within said canopy roof comprising a hinged shelf member supported at its forward end, means for displacing the hinge axis, and means for supporting the auxiliary roof section as a forward extension to said canopy roof.

18. A superstructure for road vehicles comprising in combination a canopy superimposed upon the body proper, a rigid auxiliary roof section, a forward supporting frame, means for adjustably securing the said auxiliary roof section thereon comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said canopy and said auxiliary roof section by clamping plates, means for maintaining the awning fully extended and for defining the contour thereof, comprising telescopic former strut members of quadrant section, and having inturned radial flanges, tensional springs connecting their overlapping ends, and projecting plate members fixed to said canopy and to said auxiliary roof section disposed to support the respective free ends of said strut members, transverse crown stretchers for the awning disposed between and against the adjacent inturned parallel radial flanges, means for supporting the folded awning and transverse crown stretchers within said canopy roof comprising a hinged shelf member supported at its forward end, means for displacing the hinge axis, and means for supporting the auxiliary roof section, as a forward extension to said canopy roof, comprising a flute or corrugation on the crown of the rear end of the auxiliary roof section, a flute or corrugation on the crown of the forward end of the canopy roof, means for effecting superimpositioning of said flutes or corrugations, and means for maintaining the superimposed position disposed at the lower parts of said auxiliary roof section and canopy roof.

19. A superstructure for road vehicles, comprising in combination a canopy roof having a flared rigid base, removable supporting side and rear panels therefor disposed toward the rear of the body proper, means for receiving the canopy roof on the top of the body proper, a rigid auxiliary roof section, a forward support therefor, a foldable awning permanently connecting said canopy and said auxiliary roof section, means for supporting the auxiliary roof section as a forward extension to said canopy roof and means for supporting the folded awning on said canopy roof when said auxiliary roof section is disposed as a forward extension to said canopy roof.

20. A superstructure for road vehicles, comprising in combination a canopy roof having a flared rigid base, removable supporting side and rear panels therefor, disposed toward the rear of the body proper, means for receiving the canopy roof on the top of the body proper, a rigid auxiliary roof section, a forward supporting frame, means for adjustably securing the said auxiliary roof section thereon comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said canopy and said auxiliary roof section by clamping plates, means for maintaining the awning fully extended and for defining the contour thereof, comprising telescopic former strut members of quadrant section, and having inturned radial flanges, tensional springs connecting their overlapping ends, and projecting plate members fixed to said canopy and to said auxiliary roof section disposed to support the respective free ends of said strut members, transverse crown stretchers for the awning disposed between and against the adjacent inturned parallel radial flanges, means for supporting the folded awning and transverse crown stretchers within said canopy roof, comprising a hinged shelf member supported at its forward end, means for displacing the hinge axis, and means for supporting the auxiliary roof section as a forward extension of said canopy roof.

21. A superstructure for road vehicles comprising in combination a canopy roof having a flared rigid base, removable supporting side and rear panels therefor, disposed toward the rear of the body proper, means for receiving the canopy on the top of the body proper, a rigid auxiliary roof section, a forward supporting frame, means for adjustably securing the said auxiliary roof section thereon, comprising upstanding projections on said frame member, coöperating socket members on the auxiliary roof section slidable in relation thereto, means for adjustably clamping said socket members to said auxiliary roof section and independent means for clamping said socket members to said projections, a foldable awning secured to said canopy and said auxiliary roof section by clamping plates, means for maintaining the awning fully extended and for defining the contour thereof, comprising telescopic former strut members of quadrant section, and having inturned radial flanges, tensional springs connecting their overlapping ends, and projecting plate members fixed to said canopy and to said auxiliary roof section disposed to support the respective free ends of said strut members, transverse crown stretchers for the awning disposed between and against the adjacent inturned parallel radial flanges, means for supporting the folded awning and transverse crown stretchers within said canopy roof, comprising a hinged shelf member supported at its forward end, means for displacing the hinge axis, and means for supporting the auxiliary roof section as a forward extension to said canopy roof, comprising a flute or corrugation on the crown of the rear end of the auxiliary roof section, a flute or corrugation on the crown of the forward end of the canopy roof, means for effecting superimpositioning of said flutes or corrugations, and means for maintaining the superimposed position disposed at the lower parts of said auxiliary roof section and canopy roof.

In testimony whereof I affix my signature.

ALLIOTT V. ROE.